(12) United States Patent
Tanaka et al.

(10) Patent No.: US 9,097,862 B2
(45) Date of Patent: Aug. 4, 2015

(54) CONNECTOR

(75) Inventors: Tetsugaku Tanaka, Shinagawa (JP);
Osamu Daikuhara, Shinagawa (JP);
Manabu Shimizu, Shinagawa (JP);
Toshihiro Kusagaya, Shinagawa (JP);
Byung Hoon Jeon, Shinagawa (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 13/437,398

(22) Filed: Apr. 2, 2012

(65) Prior Publication Data

US 2012/0251056 A1 Oct. 4, 2012

(30) Foreign Application Priority Data

Apr. 4, 2011 (JP) ................................. 2011-083027

(51) Int. Cl.
*G02B 6/36* (2006.01)
*G02B 6/38* (2006.01)
*G02B 6/42* (2006.01)

(52) U.S. Cl.
CPC ............ *G02B 6/3817* (2013.01); *G02B 6/4293* (2013.01); *G02B 6/3853* (2013.01); *G02B 6/3885* (2013.01)

(58) Field of Classification Search
CPC ............................ G02B 6/3897; G02B 6/4256
USPC ...................................................... 385/53–93
See application file for complete search history.

(56) References Cited

U.S. PATENT DOCUMENTS

| 5,371,820 | A | * | 12/1994 | Welbourn et al. ................ 385/76 |
| 2003/0016920 | A1 | | 1/2003 | Sohmura et al. |
| 2004/0264879 | A1 | | 12/2004 | McColloch et al. |
| 2008/0013895 | A1 | * | 1/2008 | Daikuhara ........................ 385/88 |
| 2009/0215320 | A1 | * | 8/2009 | Iranpour Feridani et al. 439/660 |
| 2010/0028017 | A1 | | 2/2010 | Mizoguchi |
| 2010/0046891 | A1 | * | 2/2010 | Sabo ................................. 385/74 |
| 2010/0171023 | A1 | | 7/2010 | Asahi et al. |
| 2011/0262082 | A1 | * | 10/2011 | Sakurai et al. ................... 385/89 |
| 2012/0020629 | A1 | * | 1/2012 | Shiratori et al. ................. 385/93 |

FOREIGN PATENT DOCUMENTS

| JP | 10-332983 | 12/1998 |
| JP | 2003-107305 | 4/2003 |
| JP | 2005-49836 | 2/2005 |

(Continued)

OTHER PUBLICATIONS

Office Action dated Feb. 3, 2015 in corresponding Japanese Patent Application No. 2011-083027.

*Primary Examiner* — Ellen Kim

(74) *Attorney, Agent, or Firm* — Staas & Hasey LLP

(57) ABSTRACT

A connector 100 comprises an optical module which has an optical element which is mounted on a mounting surface of a circuit board, said mounting surface being vertical to a connection direction of said connector and an optical waveguide member 140 which has a clad part 142 and a core part 143 which is formed inside of the clad part 142, the optical waveguide member 140 being provided with a first end face 144 which is arranged facing the mounting surface of the circuit board 131 and a second end face 145 at an opposite side to the first end face 144, the core part 143 being formed so as to propagate light between an optical fiber 241 which is supported by another connector 200 which is arranged facing the second end face 145 and the optical element 132.

9 Claims, 9 Drawing Sheets

(56) References Cited

FOREIGN PATENT DOCUMENTS

| JP | 2007-241200 | 9/2007 |
| JP | 2008-20740 | 1/2008 |
| JP | 2008-65287 | 3/2008 |
| JP | 2008-281746 | 11/2008 |
| JP | 2011-233500 | 11/2011 |

\* cited by examiner (a)

(b)

(c)

(d)

CONNECTOR

CROSS-REFERENCE TO RELATED APPLICATIONS

This application is based upon and claims the benefit of priority from prior Japanese Patent Application No. 2011-083027 filed on Apr. 4, 2011, the entire contents of which are incorporated herein by reference.

BACKGROUND OF THE INVENTION

1. Field of the Invention

The present invention relates to a connector.

2. Description of the Related Art

In the field of signal transmission, in particular the field of optical signal transmission, an optical waveguide member is known as a light propagating element which is able to additionally give functions of an optical switch, optical coupler, etc. In recent years, so-called "polymer optical waveguide members" made from polymer materials have been developed.

In this regard, known in the art is a connector which is provided with a photoelectric conversion module which is provided with a circuit board which has a photoelectric conversion element for converting an electrical signal and an optical signal between each other (hereinafter referred to as "optical element") mounted on one surface of the same (hereinafter referred to as "the mounting surface") (hereinafter referred to as "the optical module") and with an optical waveguide member which is arranged on the mounting surface of the circuit board and which guides light involved in a photoelectric conversion action of the optical element (that is, the light emitting action or light receiving action) in a direction parallel to the mounting surface (for example, see Japanese Patent Publication (A) No. 2007-241200).

SUMMARY OF INVENTION

This type of optical module uses the optical waveguide member to cause light which acts (that is, which is emitted or received) in a direction vertical to the mounting surface to be propagated to an optical element which is mounted on the circuit board in a direction parallel to the mounting surface and forms a detachable optical connection with an optical connector which is attached to an outside optical cable for example. Therefore, the greater the number of optical cables which are mounted at the optical connector, the correspondingly greater the number of the optical elements as well and the larger the circuit board of the optical module.

For example, when mounting the receptacle side of an optical connector on a large main circuit board called a "mother board" at a server etc. along with the optical module, it is preferable that the area of the main circuit board which is occupied by the mounted optical module be smaller.

Furthermore, when mounting a member involved in propagation of light on a circuit board, the precision of alignment has a tremendous effect on the efficient of light propagation, so a higher precision is sought.

The present invention, in one aspect, provides a connector which mounts an optical module in a space-saving manner.

The present invention, in another aspect, provides a connector which precisely mounts a member involved in propagation of light.

In a first aspect of the present invention, there is provided a connector which comprises an optical module which has an optical element which is mounted on a mounting surface of a circuit board, the mounting surface being vertical to a connection direction of the connector and an optical waveguide member which has a clad part and a core part which is formed inside of the clad part, the optical waveguide member being provided with a first end face which is arranged facing the mounting surface of the circuit board and a second end face at an opposite side to the first end face, the core part being formed so as to propagate light between an optical fiber which is supported by another connector which is arranged facing the second end face and the optical element.

That is, according to this aspect, by arranging the mounting surface of the circuit board of the optical module to be vertical to the connection direction of the connector, it is possible to make the light receiving surface or the light emitting surface of the optical element face the connection direction and possible to make the circuit board of the optical module compact and space saving. Further, for example, when mounting the connector on still another main circuit board and performing connection in a direction parallel to the mounting surface of the above main circuit board, since the optical module is mounted inside the connector, there is no need for separately providing an optical module on the main circuit board and therefore the mounting surface of the main circuit board can be effectively utilized.

In a second aspect of the present invention, there is provided a connector wherein the connector further comprises electrical signal contacts and can transfer electrical signals with the other connector.

That is, according to this aspect, since the connector is further provided with electrical signal contacts, optical connection and electrical connection can be simultaneously realized. Therefore, the electrical connection parts can also be used for optical connection while utilizing other interface standards.

In a third aspect of the present invention, there is provided a connector wherein the electrical signal contacts are formed based on USB specifications That is, according to this aspect, it becomes possible to further add optical connection to interface standards known in the field of personal computers for electrical connection such as the USB 2.0 and 3.0 Specifications etc.

In a fourth aspect of the present invention, there is provided a connector wherein the optical module and the optical waveguide member are connected together in a series arrangement in the connection direction by engagement of a projecting engagement part which is provided at either one and a recessed engagement part which is provided at the other.

That is, according to this aspect, by engaging the optical module and optical waveguide member by a projecting engagement part and recessed engagement part, it is possible to accurately position the optical fiber and the optical element and reduce optical loss due to positioning error.

In a fifth aspect of the present invention, there is provided a connector wherein the optical waveguide member has a coupling part which couples with a fiber support member which is provided at the other connector and supports an optical fiber and wherein the coupling results in their being coupled with each other at the time of connection of the connector and the other connector.

That is, according to this aspect, by having the optical waveguide member have a connecting part and engaging it with the fiber support member of another connector, it becomes possible to accurately position the optical waveguide member and the fiber support member and reduce optical loss due to positioning error.

In a sixth aspect of the present invention, there is provided a connector which comprises an optical module which has an optical element which is mounted on a mounting surface of a circuit board, the mounting surface being vertical to a connection direction of the connector and electrical signal contacts which are connected to the optical module and transfer electrical signals with another connector which is connected to the connector.

That is, according to this aspect, by arranging the mounting surface of the circuit board of the optical module to be vertical to the connection direction of the connector, it is possible to make the light receiving surface or the light emitting surface of the optical element face the connection direction and possible to make the circuit board of the optical module compact and space saving. Further, since the optical module and electrical signal contacts are connected, it becomes possible to use an optical cable, which is faster in signal propagation in the cable, while utilizing other interface standards which utilize electrical connection.

In a seventh aspect of the present invention, there is provided a connector wherein the connector further comprises an optical connection member which is mounted on the mounting surface of the optical module and forms an optical connection between an optical fiber and the optical element.

That is, according to this aspect, it becomes possible to provide an optical connection member and thereby form a reliable optical connection between an optical fiber and an optical element.

In an eighth aspect of the present invention, there is provided a connector wherein a marker is arranged on the mounting surface of the optical module and the optical connection member is mounted on the mounting surface by determination of the relative positions by image recognition of the marker.

That is, according to this aspect, it becomes possible to use image recognition technology which utilizes markers so as to enable positioning of members more precisely.

In a ninth aspect of the present invention, there is provided a connector wherein the electrical signal contacts are formed based on USB specifications.

That is, according to this aspect, it becomes possible to utilizing an optical cable, which is faster in signal propagation in the cable, while utilizing interface standards which are well known in the field of personal computers for electrical connection such as the USB 2.0 and 3.0 Specifications etc.

Below, the present invention will be able to be understood more clearly from the attached drawings and the description of the preferred embodiments of the present invention.

DESCRIPTION OF THE PREFERRED EMBODIMENTS

Figure 1A:
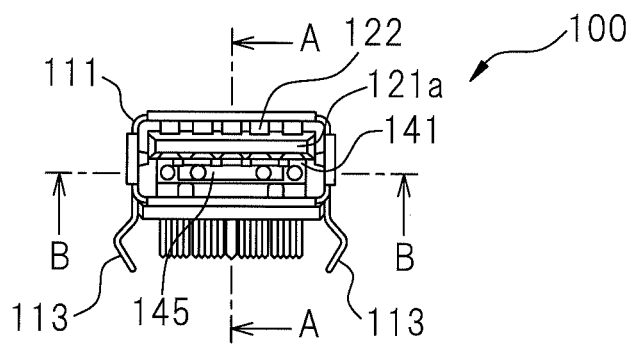
FIG. 1A is a front view of a receptacle connector according to one aspect of the present invention.

Below, embodiments of the present invention will be explained in detail while referring to the drawings. Throughout the figures, corresponding components will be assigned common reference notations.

Figure 1B:
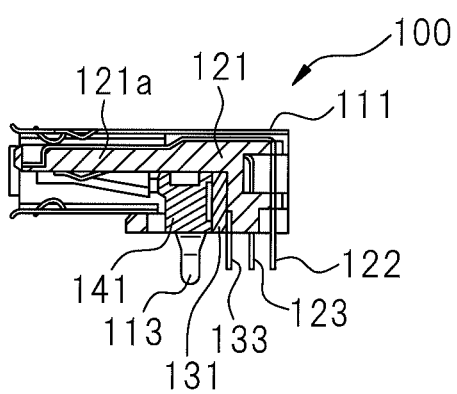
FIG. 1B is a cross-sectional view along the line A-A.
Figure 1C:
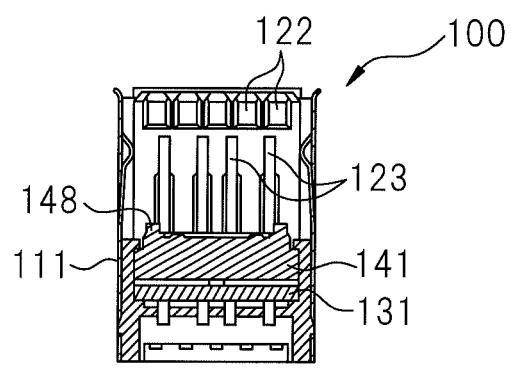
FIG. 1C is a cross-sectional view along the line B-B.
Figure 2:
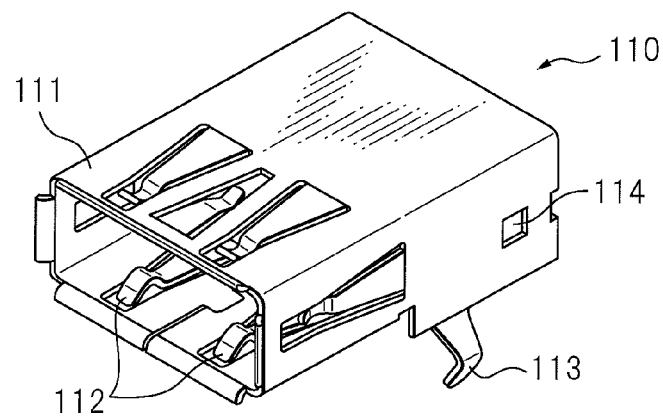
FIG. 2 is a disassembled perspective view of the receptacle connector which is shown in FIGS. 1A to 1C.
Figure 2:
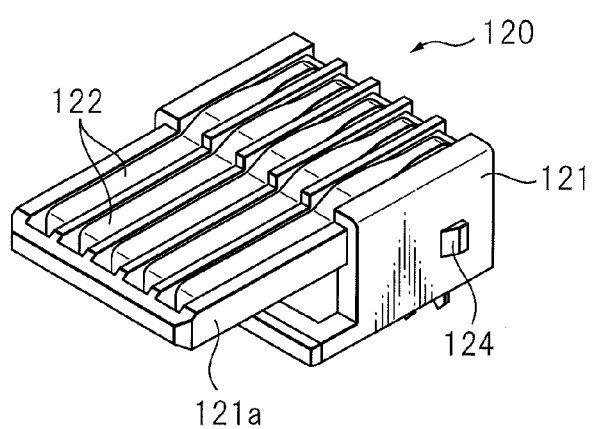
Figure 2:
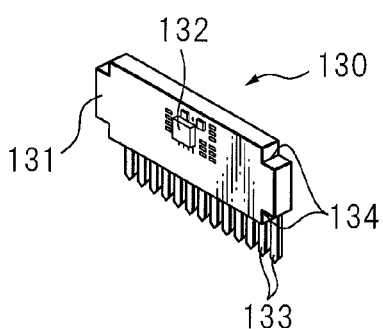
Figure 2:
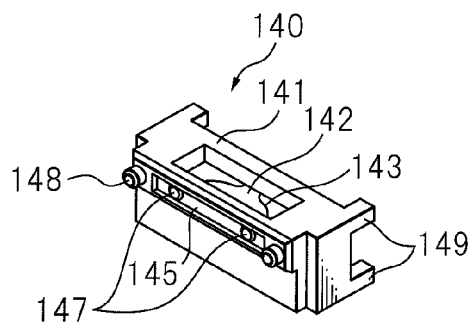

FIG. 1A is a front view of a receptacle connector 100 according to one aspect of the present invention, FIG. 1B is a cross-sectional view along the line A-A, and FIG. 1C is a cross-sectional view along the line B-B, while FIG. 2 is a disassembled perspective view of the receptacle connector 100 which is shown in FIGS. 1A to 1C. Further, FIG. 3 is a perspective view of a plug connector 200 which is connected to a receptacle connector 100 which is shown in FIGS. 1A to 1C, while FIG. 4 is a disassembled perspective view of the plug connector 200 which is shown in FIG. 3.

Figure 3:
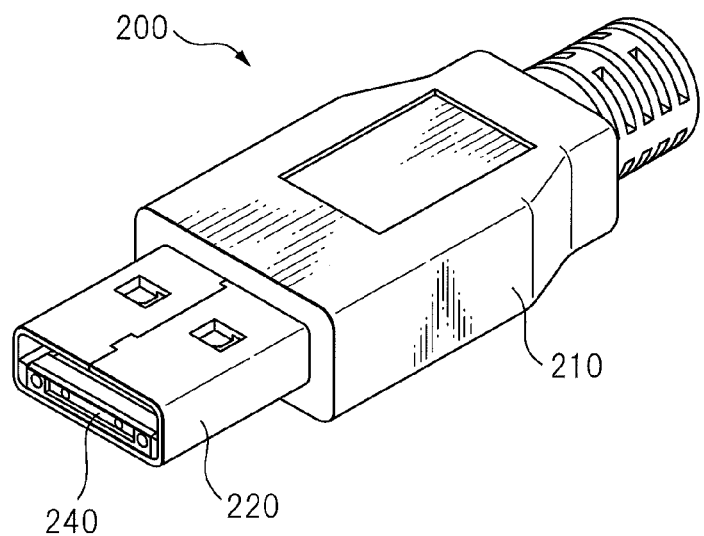
FIG. 3 is a perspective view of a plug connector which is connected to a receptacle connector which is shown in FIGS. 1A to 1C.
Figure 4:
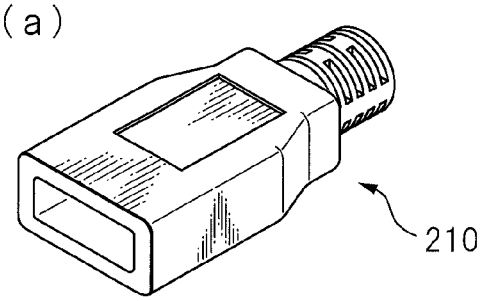
FIG. 4 is a disassembled perspective view of the plug connector which is shown in FIG. 3.
Figure 4:
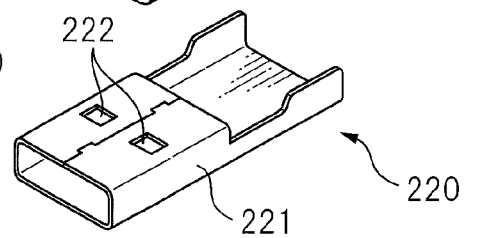
Figure 4:
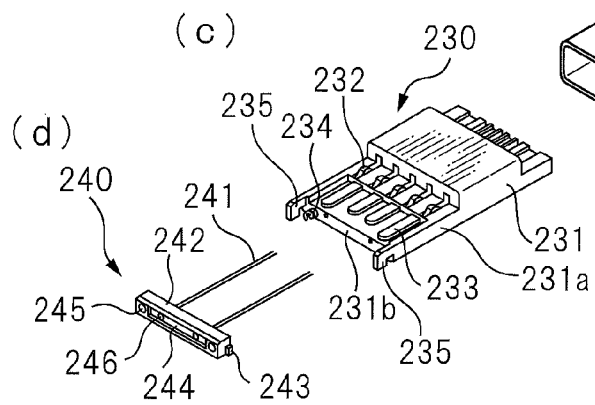
Figure 5:
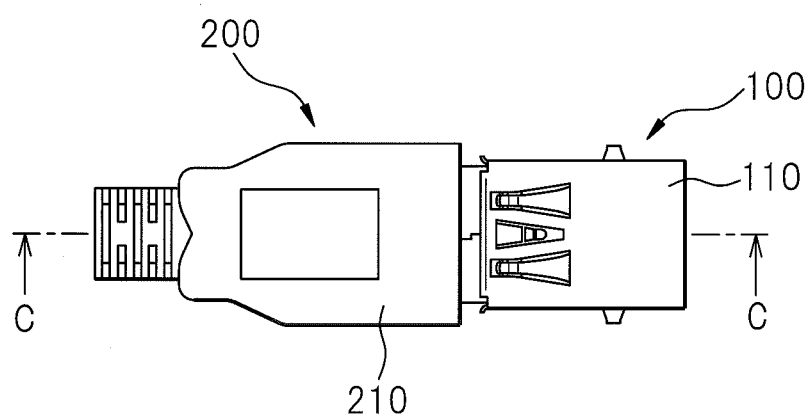
FIG. 5 is a top view of the state where a receptacle connector which is shown in FIGS. 1A to 1C and a plug connector which is shown in FIG. 3 are connected.
Figure 6:
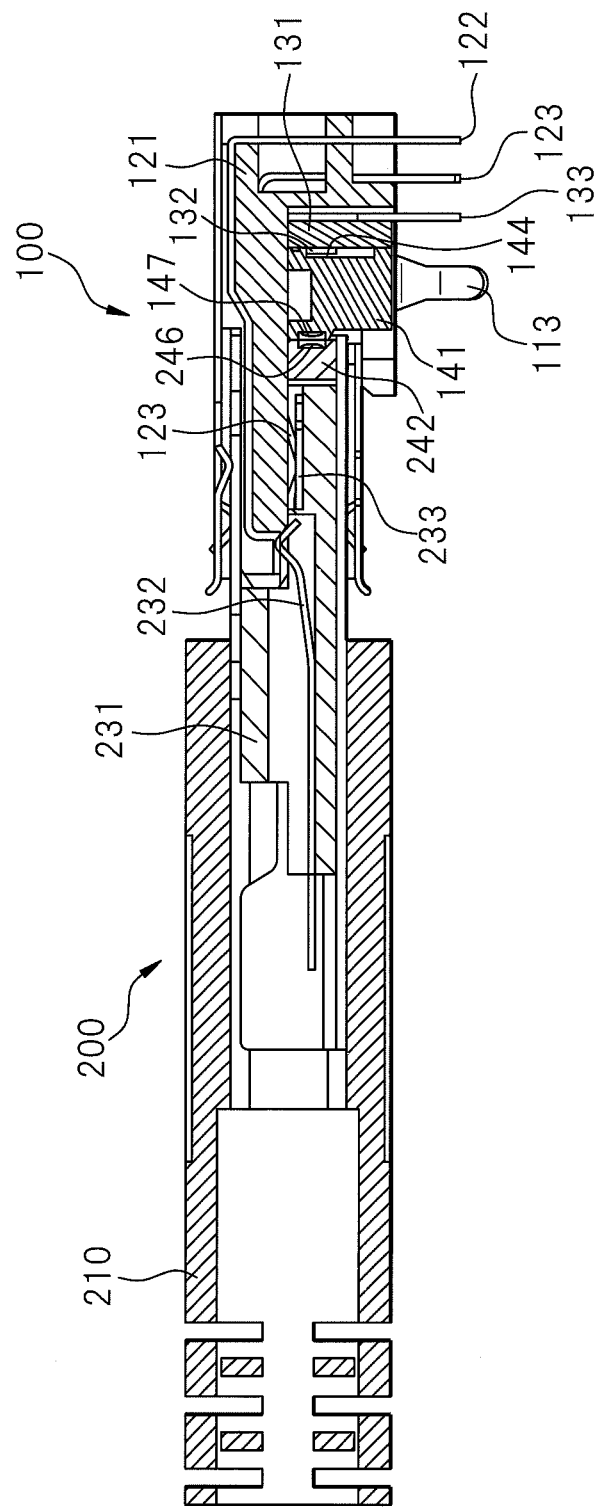
FIG. 6 is a cross-sectional view along the line C-C of FIG. 5.
Figure 7:
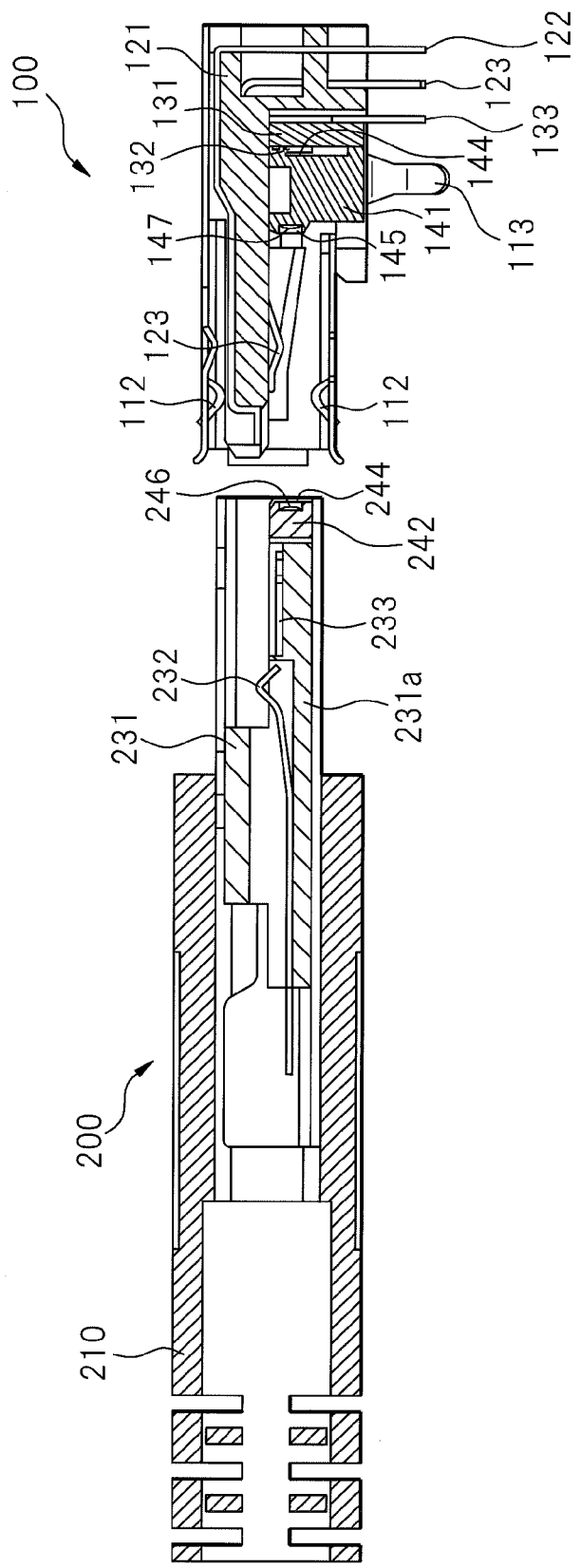
FIG. 7 is a cross-sectional view along the line C-C of the state where the receptacle connector and the plug connector which are shown in FIG. 5 are separated.
Figure 8:
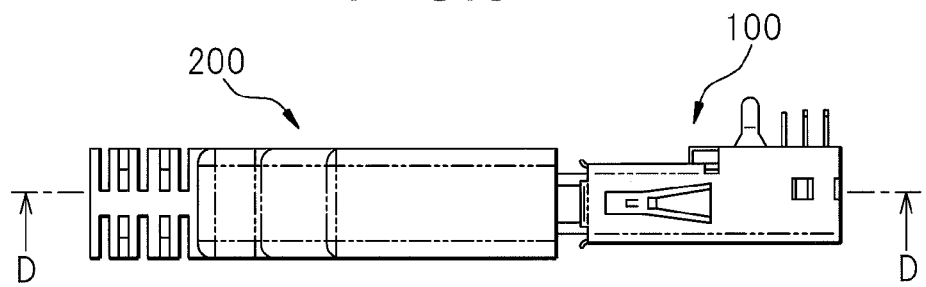
FIG. 8 is a side view of the state where a receptacle connector which is shown in FIGS. 1A to 1C and a plug connector which is shown in FIG. 3 are connected.
Figure 9:
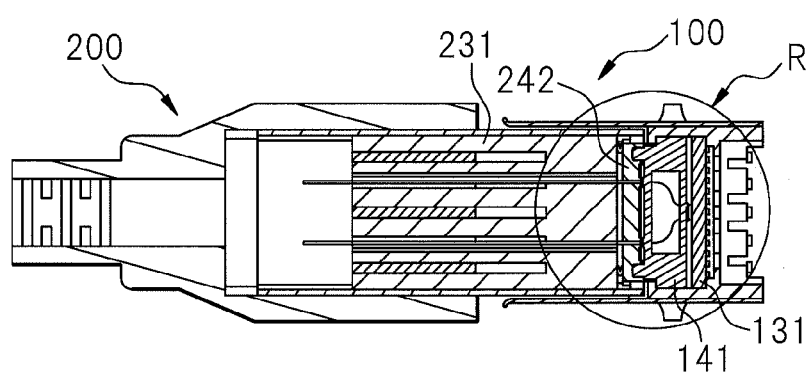
FIG. 9 is a cross-sectional view along the line D-D of FIG. 8.
Figure 10:
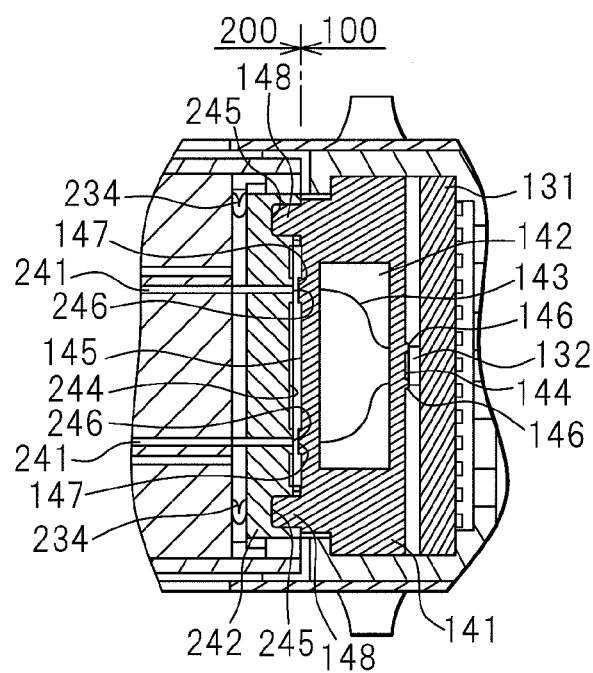
FIG. 10 is an enlarged cross-sectional view of the part R of FIG. 9.

Further, FIG. 5 is a top view of the state where a receptacle connector 100 which is shown in FIGS. 1A to 1C and a plug connector 200 which is shown in FIG. 3 are connected, FIG. 6 is a cross-sectional view along the line C-C of FIG. 5, FIG. 7 is a cross-sectional view along the line C-C of the state where the receptacle connector 100 and the plug connector 200 which are shown in FIG. 5 are separated, FIG. 8 is a side view of the state where a receptacle connector 100 which is shown in FIGS. 1A to 1C and a plug connector 200 which is shown in FIG. 3 are connected, FIG. 9 is a cross-sectional view along the line D-D of FIG. 8, and FIG. 10 is an enlarged cross-sectional view of the part R of FIG. 9.

In the explanation of this specification, referring to FIGS. 1A to 1C, the surface of the receptacle connector 100 where contacts for forming electrical connection stick out will be referred to as the "bottom surface", while the surface at the opposite side will be referred to as the "top surface". Similarly, for the plug connector 200, the upper and lower surfaces in FIG. 3 and FIG. 4 will be referred to as the "top surface" and "bottom surface". Further, at the connectors, the connection sides will be referred to as the "front" and the opposite sides as the "back".

The receptacle connector 100 and the plug connector 200 according to this aspect can simultaneously realize electrical connection and optical connection. For electrical connection, the USB (Universal Serial Bus) specifications, in particular USB 3.0, are based on.

Referring to FIGS. 1A to 1C and FIG. 2, the receptacle 100 has a shell member 110, an insulating member 120, an optical module 130, and an optical waveguide member 140. The optical module 130 and the optical waveguide member 140 are combined, placed inside the insulating member 120, and then placed inside the shell member 110 whereby the receptacle 100 is formed.

The shell member 110 has a shield case 111. At the top surface and the bottom surface of the shield case 111, holding pieces 112 are provided which assist connection with the plug connector 200 to be connected with the receptacle connector 100. Further, at the bottom surface of the shield case 111, holding pieces 113 are provided which project out from the bottom surface for attachment to the circuit board etc. to which the receptacle connector 100 is mounted. Further, at the side surfaces of the shield case 111, recessed engagement parts 114 are provided for receiving projecting engagement parts 124 of the insulating member 120.

The insulating member 120 has a main body 121. The main body 121 has a projecting part 121a which projects out to the front. Further, the main body 121 has a receptacle side first contact group 122 which is comprised of five contacts which are arranged facing the bottom surface from the top surface and which form an electrical connection with an external member of the receptacle connector 100 and a receptacle side second contact group 123 which is comprised of four contacts which are arranged passing through the inside of the main body 121 from the bottom surface of the projecting part 121a and which form an electrical connection with an external member of the receptacle connector 100. At the side surfaces of the main body 121, projecting engagement parts 124 are provided which are received in the recessed engagement parts 114 of the shell 110.

The optical module 130 has a circuit board 131, an optical element member 132 which is mounted on a mounting surface of the circuit board 131, and a third contact group 133 which is comprised of a plurality of contacts which form electrical connection with an external member of the receptacle connector 100 and extend from one side of the circuit board 131 outward in a direction parallel to the mounting surface. The optical element member 132 has a light emitting element which exhibits a light emitting action and a light receiving element which exhibits a light receiving action. Further, at the four corners of the circuit board 131, cutaway type recessed engagement parts 134 are provided for engagement with projecting engagement parts 149 of the optical waveguide member 140.

The optical waveguide member 140 has a base part 141, a clad part 142, and a core part 143 which is formed inside the clad part 142. The base part 141 substantially surrounds and fixedly supports a waveguide structure region which includes the clad part 142 and the core part 143. The core part 143 functions as an optical waveguide which propagates light between the two optical fibers 241 and the optical element member 132 of the optical module 130. The waveguide structure region, which includes the clad part 142 and the core part 143, and the base part 141 are preferably integrally formed by a molding process, but may also be formed as separate parts and later coupled together.

The clad part 142 of the optical waveguide member 140 has a first end face 144 which is arranged facing the mounting surface of the circuit board 131 of the optical module 130 and a second end face 145 which is positioned at the opposite side and is arranged facing the optical fibers 241 of the plug connector 200. The first end face 144 is preferably provided with a first lens part 146 for reducing the optical loss due to positioning error between the core part 143 and the optical element member 132 of the optical module 130. Further, the second end face 145 is preferably provided with a second lens part 147 for reducing the optical loss due to positioning error between the optical fibers 241 and the core part 143. The first lens part 146 and the second lens part 147 may be formed integrally with the optical waveguide member 140 or may be provided as separate members.

Further, at the front surface of the optical waveguide member 140, a pair of coupling projections 148 are provided for coupling with a fiber support member 240 which supports optical fibers 241 of a plug connector 200. Furthermore, at the back surface of the optical waveguide member 140, projecting engagement parts 149 are provided which engage with the recessed engagement parts 134 of the circuit board 131. By engagement of the recessed engagement parts 134 of the circuit board 131 and the projecting engagement parts 149 of the optical waveguide member 140, the optical module 130 and the optical waveguide member 140 can be compactly combined. Further, the optical fibers 241 and the optical element member 132 can be accurately positioned and optical loss due to positioning error can be reduced.

Referring to FIG. 3 and FIG. 4, the plug connector 200 has a cover member 210 which is made from an elastic insulating material, a shell member 220, an insulating member 230, and a fiber support member 240. The insulating member 230 to which the fiber support member 240 is connected is housed inside the shell member 220. Further, these are covered by the cover member 210 whereby the plug connector 200 is formed.

The shell member 220 has a shield case 221. At the top surface and the bottom surface of the shield case 221, recessed holding parts 222 are provided which receive holding pieces 112 of the receptacle connector 100 and assist connection.

The insulating member 230 has a main body 231. The main body 231 has a projecting part 231a which projects out to the front. Further, the main body 231 has, at the front part of the top surface of the projecting part 231a, a plug side first contact group 232 which is electrically connected with the receptacle side first contact group 122 in the state connected with the receptacle connector 100 and further has, at the front part of the top surface, a plug side second contact group 233 which is electrically connected with the receptacle side second contact group 123. At the front end face 231b of the projecting part 231a, a pair of spring members 234 are provided which abut against the fiber support member 240 while biasing it to the front. At the two sides of the front end face 231b, a pair of engagement tabs 235 are provided for engaging with the fiber support member 240.

The fiber support member 240 has a fiber support body 242 which supports a pair of the optical fibers 241. The optical fibers 241 pass under the projecting part 231a of the insulating member 230 and extend to a not shown back connection cable. The fiber support body 242 has engagement projections 243 at its two side surfaces, engages with the engagement tabs 235 of the insulating member 230, and is locked between the engagement tabs 235 while being biased forward by the spring members 234. Further, at the front end face 244 of the fiber support body 242, a pair of coupling recesses 245 are provided which can receive the coupling projections 148 of the optical waveguide member 140 of the receptacle connector 100, accurately position the optical waveguide member 140 and the fiber support member 242, and reduce the optical loss due to positioning error. Furthermore, at the end of each optical fiber 241, preferably a third lens part 246 is provided which is arranged facing the second lens part 147 of the optical waveguide member 140. The third lens part 246 may be formed integrally with the fiber support member 240 or may be provided separately.

FIG. 6 and FIG. 7 clearly show the electrical connection between the receptacle side first contact group 122 and the plug side first contact group 232, the electrical connection between the receptacle side second contact group 123 and the plug side second contact group 233, and the optical connection which is formed by the second lens part 147 of the optical waveguide member 140 and the third lens part 246 of the fiber support member 240 being arranged facing each other, which are formed by connecting the receptacle connector 100 and the plug connector 200.

While referring to FIG. 10, optical connection through the optical waveguide member 140 will be further explained. As explained above, according to one aspect of the present invention, the optical module 130 is housed inside the receptacle connector 100, so the smaller it is the better. Therefore, the smaller the optical element member 132 which is mounted on the circuit board 131 of the optical module 130, the better. However, if reducing the pitch between optical fibers 241 which propagate the light so as to match with the tiny optical element member 132, the effect of crosstalk will become larger. Therefore, it is possible to use the optical waveguide member 140 to maintain a predetermined pitch between the optical fibers 241 and guide the propagation path of light to the tiny optical element member 132.

That is, as explained above, the core part 143 of the optical waveguide member 140 and the optical element member 132 of the optical module 130 are connected optically through the first lens part 146. The lens surface of the first lens part 146 is formed to suppress the spread of light which is emitted from a light source, that is, an optical fiber 241, and is propagated through the core part 143 so as to focus the light on the light receiving surface of the optical element member 132. Therefore, conversely, the lens surface of the first lens part 146 is used to suppress the spread of light which is emitted from the light emitting surface of the optical element member 132 so as to focus the light at the core part 143.

On the other hand, as explained above, the core part 143 of the optical waveguide member 140 and each optical fiber 241 of the fiber support member 240 of the plug connector 200 are optically connected through the second lens part 147 and the third lens part 246. The lens surfaces of the second lens part 147 and the third lens part 246 are formed so as to make the light which is emitted from the light source, that is, the optical fiber 241 or the light emitting element of the optical element member 132, and is propagated through the core part 143 as parallel beams of light. Therefore, conversely, the parallel beams of light heading toward the optical fiber 241 or the core part 143 are focused by the lens surface of the second lens part 147 or third lens part 246 at the optical fiber 241 or the core part 143.

By arranging the second lens part 147 and the third lens part 246 facing each other and by making the light which is propagated between these lenses parallel so as to form an optical connection, it becomes possible to reduce the optical loss which is due to error at the time or positioning or part formation, for example, the connection between the optical waveguide member 140 and the fiber support member 240, the attachment of the optical fibers 241 to the fiber support member 240, the core part 143 formed inside the clad part 142, etc. That is, for example, when trying to optically connect an optical fiber 241 which has a core part of a diameter of 50 μm and an optical waveguide member 140 which has a core part 143 of a similar diameter, a 5 μm positioning error means a 10% error. On the other hand, when the action of the lens surfaces results in parallel beams of light of diameters of 500 μm, a 5 μm positioning error means only a 1% error. Therefore, by using facing lenses, it is possible to reduce the error in positioning etc. and as a result possible to also reduce the optical loss.

In the above-mentioned aspect of the present invention, as shown in FIG. 2, by arranging the mounting surface of the circuit board 131 of the optical module 130 vertical with respect to the connection direction of the connector, it is possible to make the light receiving surface or the light emitting surface of the optical element member 132 face the connection direction and possible to make the circuit board 131 of the optical module 130 compact. For example, when mounting the receptacle connector 100 on another main circuit board and performing connection in a direction parallel to the mounting surface of the above main circuit board, since the optical module 130 is mounted inside the connector, there is no need to separately provide an optical module on the main circuit board, so it becomes possible to effectively utilize the mounting surface of the main circuit board.

Further, since it is possible to simultaneously realize optical connection and electrical connection, it becomes possible to use optical connection while utilizing other interface standards besides the above USB 3.0 as electrical connection. Further, it is possible to make the connector one dedicated to optical connection with no electrical connection.

Further, in the above-mentioned aspect of the present invention, the optical waveguide member 140 had two optical propagation paths which were formed by the core part, but may also have one or three or more paths in accordance with the number of the optical fibers.

According to the aspect of the present invention explained above, optical connection and electrical connection can be simultaneously realized. Therefore, the electrical connection parts can also be used for optical connection while utilizing other interface specifications besides the USB 3.0 Specifications.

Next, the plug connector 300 according to another aspect of the present invention will be explained. The appearance of the plug connector 300 as a whole is similar to the plug connector 200 of FIG. 3 referred to in the above explanation of the aspects of the present invention.

Figure 11:
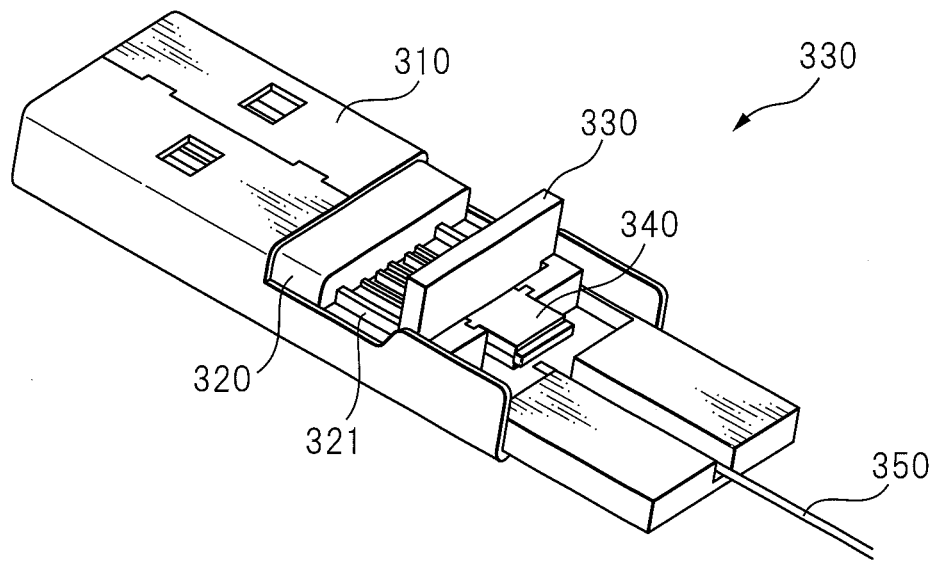
FIG. 11 is a partial disassembled perspective view of a plug connector according to another aspect of the present invention.
Figure 12:
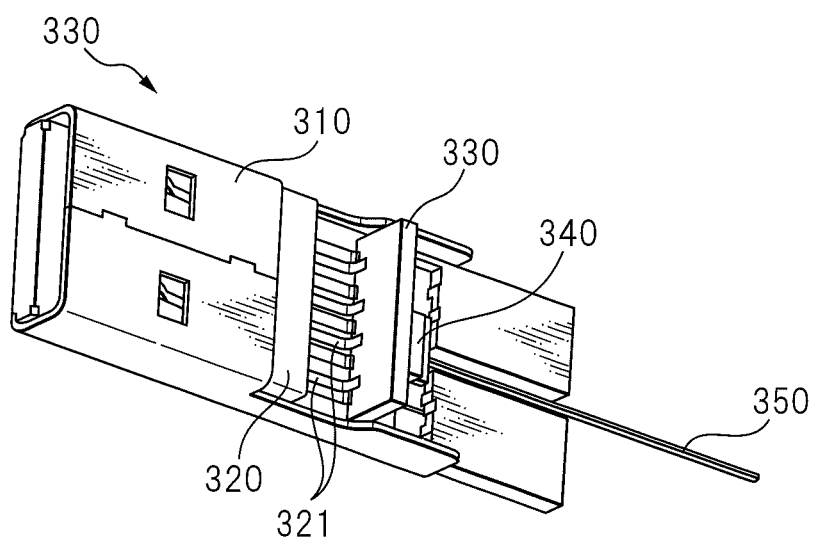
FIG. 12 is a partial disassembled perspective view of the plug connector which is shown in FIG. 11 which is seen from another angle.
Figure 13:
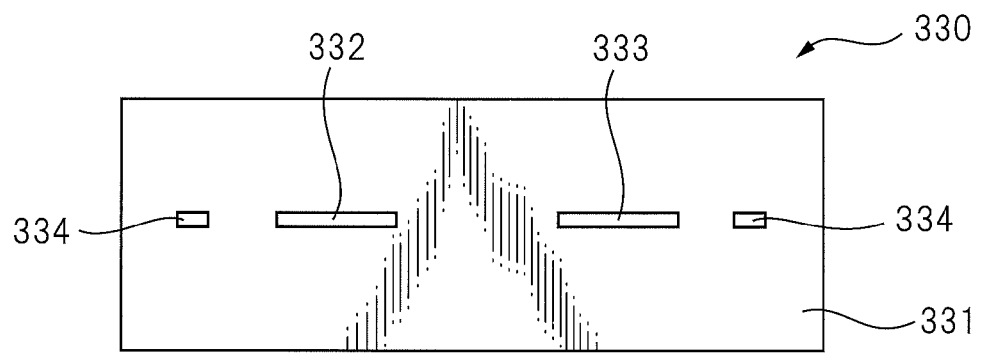
FIG. 13 is a front view of the optical module.
Figure 14:
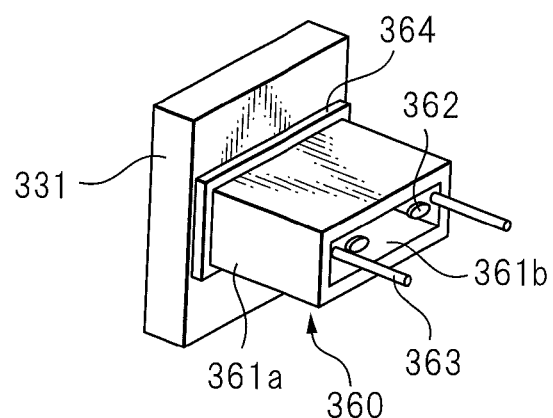
FIG. 14 is a perspective view of the fiber support member.
Figure 15:
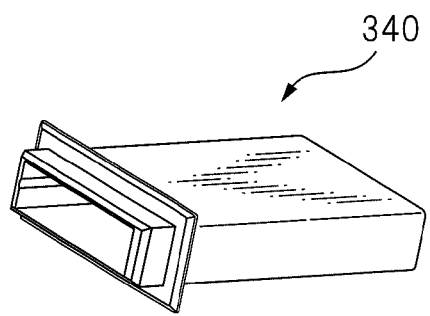
FIG. 15 is a perspective view which shows a state where an optical connection member is mounted on an optical module.

FIG. 11 is a partial disassembled perspective view of a plug connector 300 according to another aspect of the present invention, FIG. 12 is a partial disassembled perspective view of the plug connector 300 which is shown in FIG. 11 which is seen from another angle, FIG. 13 is a front view of the optical module 330, FIG. 14 is a perspective view of the fiber support member 340, and FIG. 15 is a perspective view which shows a state where an optical connection member 360 is mounted on an optical module 330.

The plug connector 300 according to the present aspect differs from the above-explained aspect of the present invention and realizes only electrical connection. For electrical connection, it is based on the USB (Universal Serial Bus) specifications, in particular the USB 3.0.

The plug connector 300 has a shell member 310, an insulating member 320, an optical module 330, and a fiber support member 340. The shell member 310 is similar to the shell member 220 of the plug connector 200 explained above.

The insulating member 320 basically, in the same way as the insulating member 230 of the plug connector 200 explained above, has a projecting part and contact groups. A space is provided at the location corresponding to the back part of the main body 231 of the plug connector 200 for mounting the optical module 330. That is, the insulating member 320 has a contact group 321 which forms electrical connection with the receptacle connector to which the plug connector 200 is to be connected at the front and which forms electrical connection with the optical module 330 at the back.

Referring to FIG. 13, the optical module 330 has a circuit board 331. The circuit board 331 has optical element members which are mounted to its mounting surface, that is, a light emitting element 332 and a light receiving element 333, and a pair of markers 334. The contact group 321 of the insulating member 320 is electrically connected to the circuit board 331. Therefore, an optical signal which is propagated by an optical fiber 350 is converted to an electrical signal through the light receiving element 333 of the optical module 330, then the converted electrical signal is propagated through the corresponding contact group 321 to the connected receptacle connector. On the other hand, an electrical signal which is propagated from the connected receptacle connector through the contact group 321 is converted to an optical signal through the light emitting element 332 of the optical module 330, then the converted optical signal is propagated to the corresponding optical fiber 350.

At the mounting surface of the optical module 330, an optical connection member 360 is mounted for forming an optical connection with the optical fiber 350 (FIG. 14). The optical connection member 360 has a main body 361. The main body 361 is a block shape which has side walls 361a which are arranged to surround the light emitting element 332 and light receiving element 333 and are vertical to the mounting surface of the circuit board 331 and a top wall 361b which closes the opening. At the top wall 361b at positions corresponding to the light emitting element 332 and light receiving element 333, a pair of lens parts 362 are provided which are formed integrally with the optical connection member 360 or are separate members. Further, at the top wall 361b, a pair of connection pins 363 stick out and are connected to corresponding recessed engagement parts of the fiber support member 340. The optical connection member 360 may have the main body 361, lens parts 362, and connection pins 363 formed integrally or provided separately. Note that, the optical connection member 360 is fastened in place by bonding the side walls 361a of the main body 361 with the mounting surface by an adhesive 364.

Referring to FIG. 15, the fiber support member 340 supports a pair of the optical fibers (not shown) in the present aspect. Further, the fiber support member 340 is made a box shape which fits over the outside of the main body 361 of the optical connection member 360. Inside, not shown recessed connecting parts are provided which engage with the connection pins 363 of the optical connection member 360.

When mounting the light emitting element 332 and light receiving element 333, the optical connection member 360, and other parts at the mounting surface of the circuit board 331, the markers 334 are found by image recognition to determine the relative mounting positions and perform the mounting. Due to this, it becomes possible to position members more precisely.

As shown in FIG. 11 and FIG. 12, by arranging the mounting surface of the circuit board 331 of the optical module 330 vertical to the connection direction of the connector, it is possible to make the light receiving surface or the light emitting surface of the optical element member face the connection direction and possible to make the circuit board 331 of the optical module 330 compact. Further, the optical module 330 and the contact group 321 are electrically connected, so it becomes possible to utilize other interface standards utilizing electrical connection while enabling signals to be propagated in a cable while utilizing a higher speed optical cable.

The connector of the aspect of the present invention explained above had one pair of optical fibers, but may also have one fiber or three or more fibers in accordance with the application.

Note that, the present invention has been explained in detail based on specific embodiments, but a person skilled in the art could make various changes, modifications, etc. without departing from the claims and concept of the present invention.

The invention claimed is:

1. A connector connectable to another connector comprising,
    a main body that includes a projecting part;
    first electrical signal contacts provided at a top surface of the projecting part, configured to be connected to corresponding first electrical signal contacts of the other connector, that transfer electrical signals with the other connector;
    second electrical signal contacts provided at a bottom surface of the projecting part, configured to be connected to corresponding second electrical signal contacts, of the other connector that transfer electrical signals with the other connector;
    an optical module provided within the connector and beneath the projecting part, that includes a circuit board, and an optical element that performs a conversion between electrical signals and optical signals which is mounted on a mounting surface of the circuit board, said mounting surface being vertical to a direction that said connector is connected to the other connector; and
    an optical waveguide member which has a clad part and core parts formed inside of said clad part, said optical waveguide member being provided with a first end face which is arranged facing said optical module mounted on said mounting surface of said circuit board and a second end face at an opposite side to said first end face facing an optical cable which is supported by the other connector, so that said core parts propagate light between the optical cable and said optical element, the pitch between said core parts at said first end face being narrower than the pitch between said core parts at said second end face.

2. A connector as set forth in claim 1, wherein said electrical signal contacts are formed based on USB specifications.

3. A connector as set forth in claim 1, wherein said optical module and said optical waveguide member are connected together in a series arrangement in said connection direction by engagement of a projecting engagement part which is provided at either one and a recessed engagement part which is provided at the other.

4. A connector as set forth in claim 1, wherein said optical waveguide member has a coupling part which couples with a fiber support member which is provided at said other connector and supports an optical fiber and wherein said coupling results in their being coupled with each other at the time of connection of said connector and said other connector.

5. A connector connectable to another connector, comprising,
    a main body that includes a projecting part;
    first electrical signal contacts provided at a top surface of the projecting part, configured to be connected to corresponding first electrical signal contacts of the other connector, that transfer electrical signals with the other connector;
    second electrical signal contacts provided at a bottom surface of the projecting part, configured to be connected to corresponding second electrical signal contacts of the other connector, that transfer electrical signals with the other connector; and an optical module that includes a circuit board, and an optical element mounted on a mounting surface of the circuit board that performs a conversion between an electrical signal and an optical signal, said mounting surface being vertical to a direction that said connector is connected to the other connector and when said connector is connected to the other connector, said optical module transfers an optical signal converted from an electrical signal by said optical element to the other connector and transfers an optical signal received from the other connector to said optical element.

6. A connector as set forth in claim 5, further comprising an optical connection member which is mounted on said mounting surface of said circuit board and forms an optical connection between an optical fiber and said optical element.

7. A connector as set forth in claim 6, wherein a marker is arranged on said mounting surface of said circuit board and said optical connection member is mounted on said mounting surface by determination of the relative positions by image recognition of said marker.

8. A connector as set forth in claim 5, wherein said electrical signal contacts are formed based on USB specifications.

9. A connector connectable to another connector having an optical cable, said connector comprising:

a main body that includes a projecting part;

first electrical signal contacts provided at a first surface of the projecting part, configured to be connected to corresponding first electrical signal contacts of the other connector, that transfer electrical signals with the other connector;

second electrical signal contacts provided at a second surface of the projecting part, with the second surface opposite to the first surface of the projecting part, configured to be connected to corresponding second electrical signal contacts of the other connector;

an optical module provided beneath the projecting part, that includes a circuit board, an optical element which is mounted on a mounting surface of the circuit board and is capable of performing signal conversion between electrical signals and optical signals, and third electrical signal contacts provided on the circuit board that are electrically connectable to a member external to the connector, said mounting surface being perpendicular to a direction that said connector is connected to the other connector; and an optical waveguide member which has a clad part and core parts formed inside of said clad part, said optical waveguide member disposed at a position in which a first end face of the optical waveguide member faces said optical module mounted on said circuit board and a second end face of the optical waveguide member at an opposite side to said first end face faces the optical cable of the other connector when connected to the connector, whereby said core parts propagate light between the optical cable and said optical element.

* * * * *